United States Patent [19]

Weber et al.

[11] Patent Number: 5,673,389

[45] Date of Patent: Sep. 30, 1997

[54] METHODS AND APPARATUS FOR RESETTING A MONITORED SYSTEM USING A GRAY CODE WITH ALTERNATING CHECK BITS

[75] Inventors: Charles Francis Weber, South Lyon; Viral Ashokkumar Amin, Riverview, both of Mich.

[73] Assignee: Ford Motor Company, Dearborn, Mich.

[21] Appl. No.: 522,476

[22] Filed: Aug. 31, 1995

[51] Int. Cl.$^6$ ............................ G06F 11/00; G06F 11/30
[52] U.S. Cl. ....................................................... 395/185.08
[58] Field of Search .................... 395/182.21, 185.08, 395/185.09; 371/61, 62

[56] References Cited

U.S. PATENT DOCUMENTS

| | | | |
|---|---|---|---|
| 4,553,200 | 11/1985 | Sibley | 395/183.1 |
| 4,956,807 | 9/1990 | Hosaka et al. | 395/185.08 |
| 5,014,190 | 5/1991 | Johnson | 395/182.21 |
| 5,073,853 | 12/1991 | Johnson | 395/182.21 |
| 5,287,862 | 2/1994 | Liencres | 395/185.08 |
| 5,341,497 | 8/1994 | Younger | 395/185.04 |

*Primary Examiner*—Robert W. Beausoliel, Jr.
*Assistant Examiner*—Phillip Francis Vales
*Attorney, Agent, or Firm*—Roger L. May; Peter Abolins

[57] ABSTRACT

Systems which progress through a series of states or program steps, such as software controlled computers, are monitored by means of a watchdog timer which samples at least two check bits generated by a system being monitored with the check bits being generated such that only one can change its logic state between valid samples of the check bits. The monitored system is reset if a fault within the system results in an error in the normal sequence through the series of states or program steps such that more than one of the check bits changes from sample to sample. In addition, if the sequence becomes static such that no bits change within the check bits from sample to sample, a time-out will occur which also resets the monitored system. Preferably, the check bits are generated in accordance with Gray code.

11 Claims, 3 Drawing Sheets

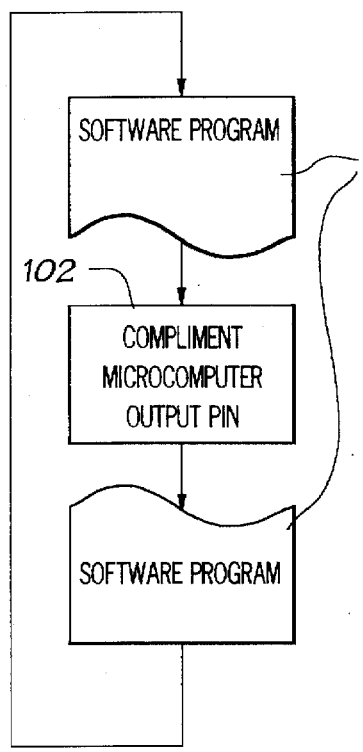
FIG. 1
PRIOR ART
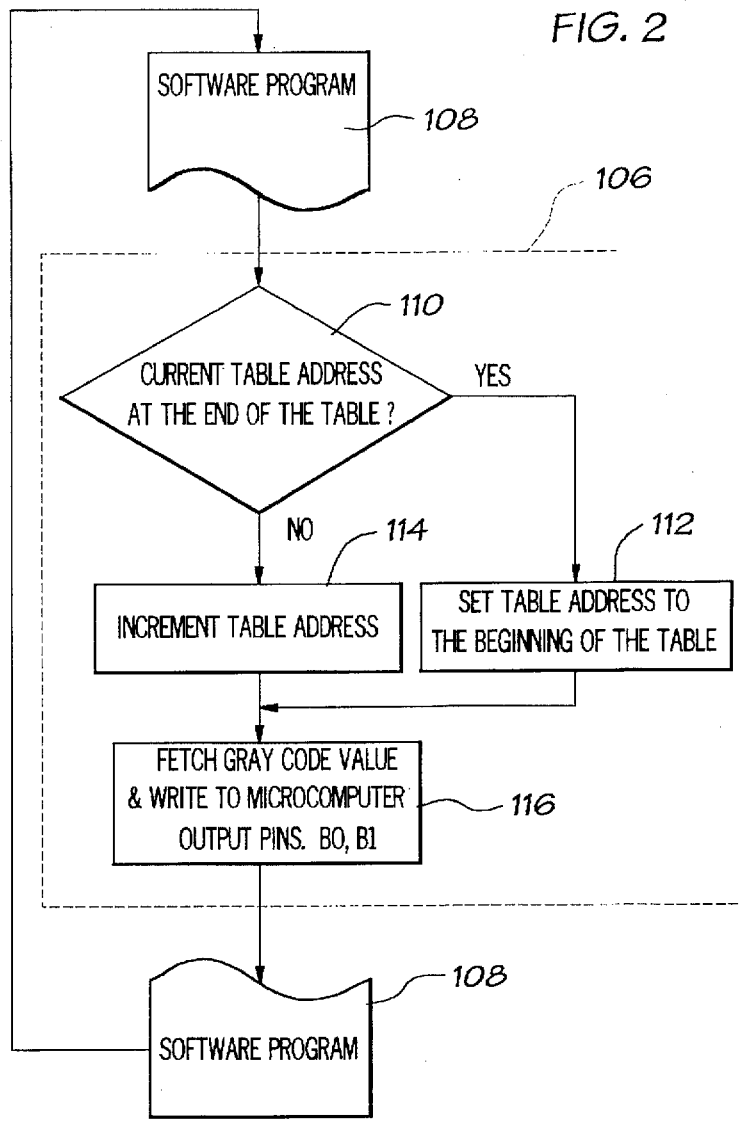
FIG. 2
FIG. 3
GRAY CODE TABLE
| ADDRESS | VALUE |
| --- | --- |
| 0 | 00 |
| 1 | 01 |
| 2 | 11 |
| 3 | 10 |

METHODS AND APPARATUS FOR RESETTING A MONITORED SYSTEM USING A GRAY CODE WITH ALTERNATING CHECK BITS

BACKGROUND OF THE INVENTION

The present invention relates in general to monitoring systems which progress through a series of states or program steps and, more particularly, to methods and apparatus for monitoring such systems by means of a watchdog timer which samples at least two check bits generated by a system being monitored with the check bits being generated such that only one can change its logic state between valid samples of the check bits. The monitored system is reset if a fault within the system results in an error in the normal sequence through the series of states or program steps such that the check bits fail to change as required or if the sequence becomes static. While the present invention is generally applicable to a variety of systems, it will be described herein with primary reference to a software driven computer for which it is particularly applicable and for which it is being applied initially.

Timers for monitoring a system, such as software driven computers, are known in the art for monitoring operation of the system and resetting it if system problems occur. Typically, such timers must be periodically reset by a signal from the system being monitored. If the reset signal is not received as expected for a given system, the timer, often referred to as a "watchdog" timer, will timeout or overflow resulting in a reset of the system.

Many watchdog timers monitor a single bit from the system being monitored. As long as the single bit toggles between its "0" and "1" states, the watchdog timer is kept at bay indicating that the system is operating properly without resetting the system. Unfortunately, with such simplified servicing of a watchdog timer, there is a definite probability that a system which has crashed may continue to satisfactorily service the watchdog timer. In that event, a crashed system goes undetected.

Accordingly, there is a need for an improved arrangement for monitoring a system, such as a software driven computer, to detect faults within the system which result in an error in the normal sequence through the series of states or program steps of the system or stop the normal sequence.

SUMMARY OF THE INVENTION

This need is met by the invention of the present application wherein methods and apparatus are provided for monitoring systems which progress through a series of states or program steps, such as software controlled computers, by means of a watchdog timer which samples at least two check bits generated by a system being monitored with the check bits being generated such that only one can change its logic state between valid samples of the check bits. The monitored system is reset if a fault within the system results in an error in the normal sequence through the series of states or program steps such that more than one of the check bits changes from sample to sample. In addition, if the sequence becomes static such that no bits change within the check bits from sample to sample, a time-out will occur which also resets the monitored system.

In accordance with one aspect of the present invention, a timer for resetting a monitored system comprises output logic for generating a reset signal for the monitored system. A counter having a clear input and an overflow output connected to the output logic counts pulses from a source of periodic pulses. A monitored system error detector periodically samples at least two check bits from the monitored system which normally operates to generate the at least two check bits in a series of states with successive states differing from one another by only one bit. The error detector generates a pass signal on a first output coupled to the clear input of the counter for each sample of the at least two check bits wherein only one of the at least two check bits changes state from the succeeding sample; and, generates an error signal on a second output connected to the output logic for each sample of the at least two check bits wherein more than of the at least two check bits has changed state from the succeeding sample. The output logic generates a reset signal for the monitored system in response to an overflow of the counter or the error signal from the monitored system error detector. Preferably, the monitored system error detector comprises Gray code logic.

In accordance with another aspect of the present invention, a method for resetting a monitored system comprises: operating the monitored system to generate at least two check bits which progress through a defined series of states with each state differing from adjacent states by only one bit position. A counter is operated to count pulses from a source of periodic pulses and the at least two check bits generated by operation of the monitored system are periodically sampled. A pass signal is generated for each sample of the at least two check bits wherein only one of the at least two check bits changes state and the counter is cleared in response to each pass signal. An error signal on a second output connected to the output logic for each sample of the at least two check bits wherein more than one of the at least two check bits has changed state and a reset signal is generated for the monitored system in response to an overflow of the counter or the error signal from the monitored system error detector. Preferably, the step of operating the monitored system to generate at least two check bits is performed in accordance with Gray coding.

It is a feature of the present invention to provide improved methods and apparatus for monitoring systems by means of a watchdog timer which samples at least two check bits generated by a system being monitored with the check bits being generated such that only one can change its logic state between valid samples of the check bits.

Other features and advantages of the invention will be apparent from the following description, the accompanying drawings and the appended claims.

BRIEF DESCRIPTION OF THE DRAWINGS

FIG. 1 is a flow chart illustrating operation of a monitored system to service a prior art watchdog timer which monitors a single bit from the system being monitored;

FIG. 2 is a flow chart for operation of a monitored system to service a watchdog timer in accordance with the present invention which monitors at least two bits from the system being monitored;

FIG. 3 is a logic table for a two bit Gray code sequence used in an illustrative embodiment of the present invention;

DETAILED DESCRIPTION OF THE INVENTION

Figure 4:
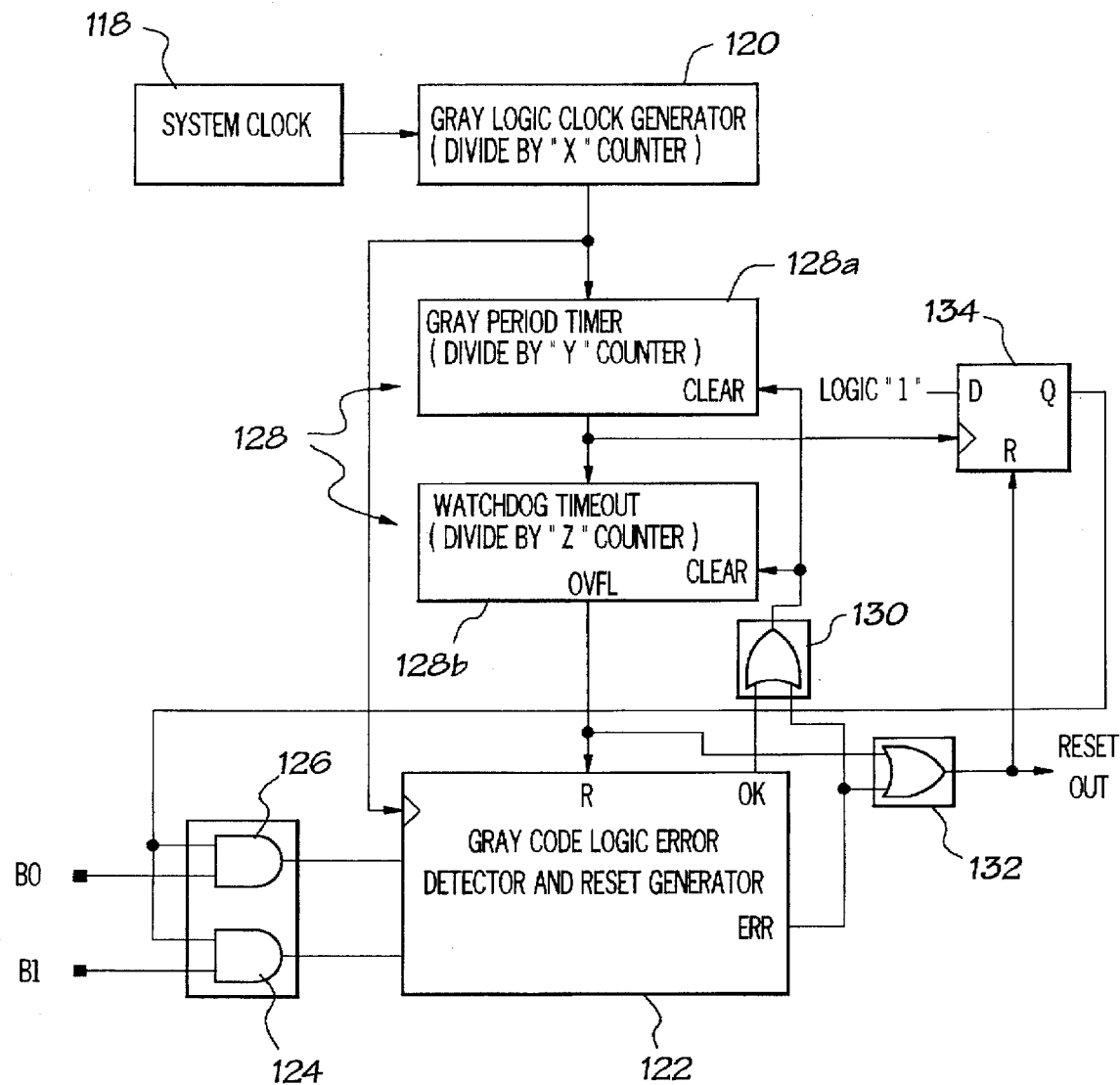
FIG. 4 is a schematic block diagram of a watchdog timer in accordance with the present invention.

The present invention will now be described with reference to the drawings wherein FIG. 1 illustrates the simplicity of operation of a monitored system to service a single bit prior art watchdog timer. As illustrated in FIG. 1, the monitored system is a microcomputer wherein a single instruction 102, performed within the software program 104 controlling the microcomputer, compliments the logic signal on an output pin of the microcomputer. As the instruction 102 is repeatedly performed by passes through the program 104, the logic signal provided on the output pin of the microprocessor toggles between a logic "0" state and a logic "1" state. The toggling must be periodically performed to reset the prior art watchdog timer monitoring the microprocessor and thereby prevent the timer from timing out and resetting the microcomputer.

To this end, it should be apparent that the instruction 102 may be inserted at a number of locations within the program 104 as needed. In the event of an error which prevents performance of the signal complimenting instruction or instructions, and hence the toggling of the signal on the monitored output pin of the microcomputer, the watchdog timer times out and resets the microcomputer. Unfortunately, with such simplified servicing of the watchdog timer, there is a definite probability that a system which has crashed may continue to satisfactorily service the watchdog timer. In that event, a crashed system goes undetected.

To reduce the probability of a watchdog timer being properly serviced by a crashed system, it is possible to increase the complexity of the watchdog timer and hence the operations which must be performed by a monitored system to service the timer. For example, a two or more bit watchdog timer could be used with the bits being advanced through a defined sequence such as sequentially counting in binary. Thus, the monitored system would have to generate an output signal having two or more bits which counted from 0 to the maximum count and then returned to 0. For a two bit watchdog timer, the count would be: 00, 01, 10, 11, 00, etc.

Unfortunately, for such a watchdog timer arrangement to function properly, the monitored system and the watchdog timer have to be synchronized with one another. For asynchronous operation, it is possible for erroneous resets to be generated by the watchdog timer. This is apparent if one considers that two bits need to simultaneously change in progressing, for example, from 01 to 10 and from 11 to 00. For two bit transitions performed asynchronously, it is possible for the watchdog timer to see a change of only one of the bits if the bits are sampled as they are in transition. Thus, while the watchdog timer is expecting the 00 count after seeing the 11 count, it could receive 01 or 10 which would be interpreted as an error and result in an erroneous reset of the microcomputer.

The watchdog timer of the present application overcomes these problems of prior art watchdog timers by monitoring at least two check bits generated by a system being monitored; however, only one of the at least two bits can be changed for each valid step of a defined sequence of bit states monitored by the watchdog timer. The generation of such a sequence of bit states of the at least two check bits requires more complexity within the state change control or software program which makes it less probable that a crashed system will continue to satisfactorily service the watchdog timer. Accordingly, the watchdog timer of the present application is more robust and better assures proper operation of the monitored system. By changing only one of the at least two check bits from bit state to bit state, the problem of generating erroneous resets as described above is eliminated.

Reference will now be made to FIG. 2 which is a flow chart for operation of an illustrative embodiment of a watchdog timer of the present application, again illustrated for use with a microcomputer. In this embodiment, Gray coding is utilized to perform the defined sequence of bit states as described above such that only one bit of the at least two check bits changes for each valid step of a defined sequence of bit states monitored by the watchdog timer. The added complexity over the flow chart of FIG. 1 is apparent. In FIG. 2, a watchdog operation block 106 comprising several program steps is performed within the software program 108 controlling the microcomputer. Here again, the watchdog operation block 106 may be inserted at a number of locations within the program 108 as needed.

The watchdog operation block 106 can be utilized to step through Gray code states, for example, as illustrated by the two bit Gray code table of FIG. 3. When the block 106 is entered, it is initially determined whether the current table address is at the end of the table, i.e., address 3 as illustrated in FIG. 3, see block 110. If the current address is at the end of the table (address 3 of FIG. 3), it is set to the beginning of the table (address 0 of FIG. 3), see block 112. If the current address is not at the end of the table, the table address is incremented to step through the table, see block 114. The Gray code value for the resulting address is then fetched and written to appropriate output pins of the microcomputer which are being monitored by the watchdog timer, see block 116.

While the watchdog timer of the present application can be implemented in a large variety of ways, including operation within a computer separate from the system or computer being monitored, it will be described herein with reference to a hardware implementation illustrated by the schematic block diagram of FIG. 4. In the implementation of the watchdog timer of FIG. 4, a clock circuit 118 generates a series of periodic pulses. A divide by "X" Gray logic clock generator or clock rate counter circuit 120 counts pulses generated by the clock circuit 118 to generate clock pulses for a Gray code logic error detector and reset generator circuit or monitored system error detector circuit 122. The monitored system error detector circuit 122 is responsive to the clock pulses from the counter circuit 120 to sample at least two check bits B0, B1 from the monitored system which are gated to the monitored system error detector circuit 122 by a pair of "AND" gates 124, 126.

A counter circuit 128, including a clear input and a carry or overflow output OVFL, counts clock pulses generated by the clock rate counter circuit 120 to serve as an overall timer which overflows to generate a reset for a monitored system if the sequence becomes static, i.e., if the Gray code or two check bits B0, B1 from the monitored system remain in a given state.

The monitored system error detector circuit 122 is a logic circuit responsive to the clock pulses generated by the counter circuit 120 for sampling at least two check bits from the monitored system which operates to generate the at least two check bits in a series of states with successive states differing from one another by only one bit. In the illustrated embodiment, the monitored system error detector circuit 122 samples the two check bits B0, B1.

For each sample of the two check bits B0, B1 wherein only one of the two check bits B0, B1 changes state from the succeeding sample, a pass signal or pulse is generated on a first output OK which is coupled to the clear input of the counter circuit 128 via an OR gate 130. For each sample of the two check bits B0, B1 wherein more than of the two check bits B0, B1 has not changed state from the succeeding sample, an error signal is generated on a second output ERR connected to output logic, an OR gate 132 as illustrated, with the output logic generating a reset signal for the monitored system in response to the error signal from the monitored system error detector 122. In the illustrated embodiment, the error signal is also connected to the OR gate 130 to clear the counter circuit 128.

The OR gate 132 also receives the signal from the overflow output OVFL of the counter circuit 128 for generating a reset signal for the monitored system in response to an overflow of the counter 128. The overflow signal from the counter circuit 128 also serves to reset the monitored system error detector 122 such that it is ready to function with the reset monitored system which returns to the initial state of the at least two check bits, i.e., 00 in the illustrated embodiment.

Figure 5:
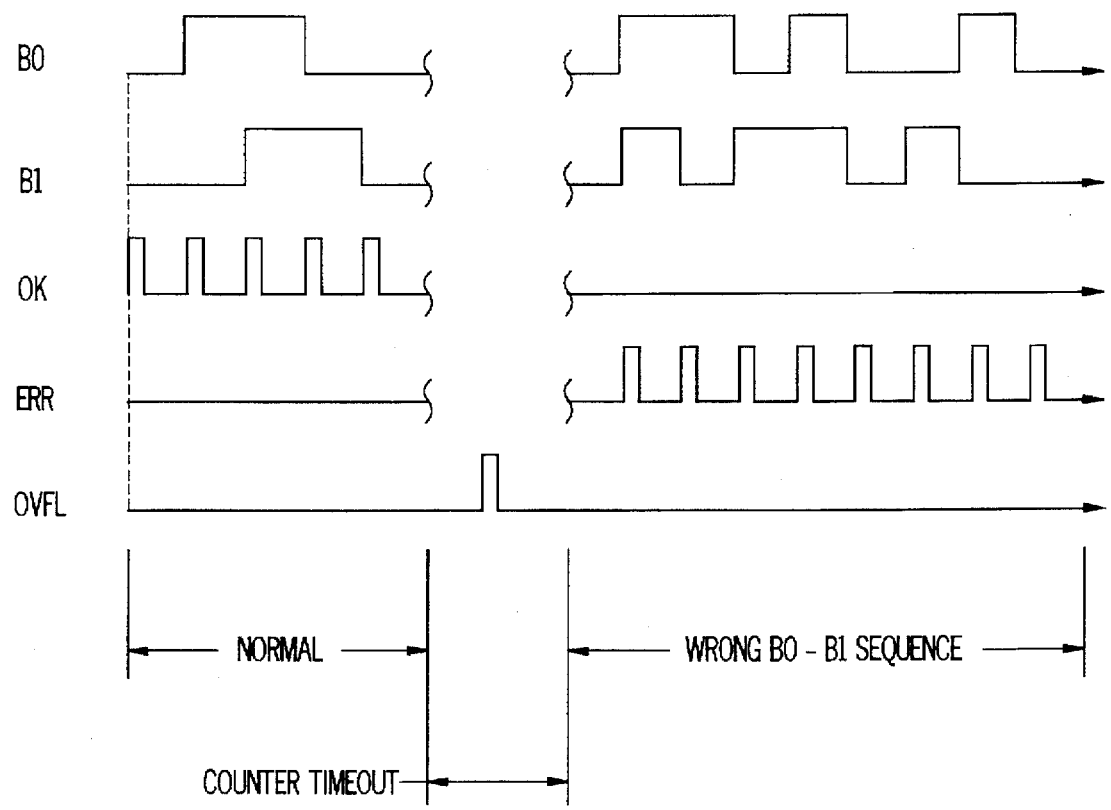
FIG. 5 is a series of waveforms illustrating operation of the watchdog timer of FIG. 4.

In FIG. 4, a logic element or enable circuit, a D-type flip-flop 134 as illustrated, is connected to prevent possibly erroneous check bits B0, B1 from being sampled by the monitored system error detector 122 during a reset of the monitored system. The counter circuit 128 is made up of two counters, a grace period timer 128a which performs a divide by "Y" on clock pulses from the counter circuit 120, and a watchdog timeout 128b which performs a divide by "Z" on the output of the grace period timer 128a. The reset signal for the monitored system is connected to reset the flip-flop 134 which disables the "AND" gates 124, 126 such that samples for the monitored system error detector 122 are forced to be 00. The flip-flop 134 remains reset until the carry output from the grace period timer 128a sets it which enables the "AND" gates 124, 126 to once again pass the check bits B0, B1 to the monitored system error detector 122 such that standard watchdog timer operation can continue. Illustrative waveforms for the watchdog timer of FIG. 4 are shown in FIG. 5.

For proper operation of the watchdog timer of the present invention, stepping through the coded sequence of check bits must be performed within a specified window or else the monitored system will be reset by the watchdog timer. In particular, if the monitored system operates too rapidly such that a required sequence of check bits is not sampled by the watchdog timer, the monitored system error detector 122 will generate a reset signal for the monitored system. On the other hand, if the monitored system operates too slowly or the check bit sequence becomes static such that a required sequence of check bits is not sampled by the watchdog timer by the time the counter circuit 128 overflows, the overflow signal will generate a reset signal for the monitored system. Thus, the watchdog timer of the present application provides a highly reliable monitor for systems which progress through a series of states or program steps to better ensure that a crashed system is quickly detected and reset.

Having thus described the invention of the present application in detail and by reference to preferred embodiments thereof, it will be apparent that modifications and variations are possible without departing from the scope of the invention defined in the appended claims.

What is claimed is:

1. A timer for resetting a monitored system, said timer comprising:

output logic for generating a reset signal for said monitored system;

a counter for counting pulses from a source of periodic pulses, said counter having a clear input and an overflow output connected to said output logic; and a monitored system error detector for periodically sampling at least two check bits from said monitored system which normally operates to generate said at least two check bits in a series of states with successive states differing from one another by only one bit, said error detector generating a pass signal on a first output coupled to said clear input of said counter for each sample of said at least two check bits wherein only one of said at least two check bits changes state from the succeeding sample and generating an error signal on a second output connected to said output logic for each sample of said at least two check bits wherein more than one of said at least two check bits has changed state from the succeeding sample, said output logic generating a reset signal for said monitored system in response to an overflow of said counter or said error signal from said monitored system error detector.

2. A timer for resetting a monitored system as claimed in claim 1 wherein said second output is coupled to said clear lead input of said counter.

3. A timer for resetting a monitored system as claimed in claim 1 wherein said monitored system is a software controlled computer.

4. A timer for resetting a monitored system as claimed in claim 1 wherein said output logic comprises an or function.

5. A timer for resetting a monitored system as claimed in claim 1 wherein said monitored system error detector comprises Gray code logic.

6. A method for resetting a monitored system comprising the steps of:

operating said monitored system to generate at least two check bits which progress through a defined series of states with each state differing from adjacent states by only one bit position;

operating a counter to count pulses from a source of periodic pulses;

periodically sampling said at least two check bits generated by operation of said monitored system;

generating a pass signal for each sample of said at least two check bits wherein only one of said at least two check bits changes state;

clearing said counter in response to each pass signal;

generating an error signal on a second output connected to said output logic for each sample of said at least two check bits wherein more than one of said at least two check bits has changed state; and generating a reset signal for said monitored system in response to an overflow of said counter or said error signal from said monitored system error detector.

7. A method for resetting a monitored system as claimed in claim 6 further comprising the step of clearing said counter in response to said error signal.

8. A method for resetting a monitored system as claimed in claim 6 wherein said step of operating said monitored system to generate at least two check bits is performed in accordance with Gray coding.

9. A circuit for resetting a monitored system comprising:

an output logic circuit for generating a reset signal for said monitored system;

a clock circuit for generating a series of periodic pulses;

a clock rate counter circuit for counting periodic pulses from said clock circuit to generate clock pulses;

a counter circuit for counting said clock pulses, said counter circuit having a clear input and an overflow output connected to said output logic circuit; and a monitored system error detector circuit responsive to said clock pulses for sampling at least two check bits from said monitored system which normally operates to generate said at least two check bits in a series of states with successive states differing from one another by only one bit, said error detector circuit generating a pass signal on a first output coupled to said clear input of said counter circuit for each sample of said at least two check bits wherein only one of said at least two check bits changes state from the succeeding sample and generating an error signal on a second output connected to said output logic for each sample of said at least two check bits wherein more than one of said at least two check bits has changed state from the succeeding sample, said output logic generating a reset signal for said monitored system in response to an overflow of said counter or said error signal from said monitored system error detector.

10. A circuit for resetting a monitored system as claimed in claim 9 further comprising an enable circuit for enabling operation of said monitored system error detector circuit, said enable circuit being set to disable said monitored system error detector circuit in response to said reset signal and being set to enable said monitored system error detector circuit by said counter circuit.

11. A circuit for resetting a monitored system as claimed in claim 10 wherein said counter circuit comprises a first portion coupled to said enable circuit and a second portion coupled to said monitored system error detector circuit.

* * * * *